Figure 1:
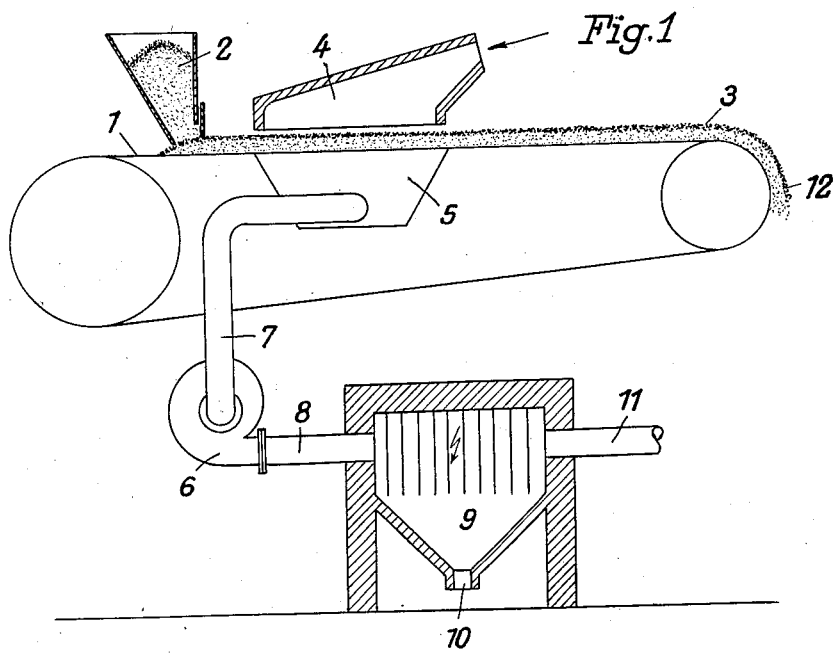

Dec. 18, 1934.  H. KLENCKE  1,984,747
PROCESS OF AND APPARATUS FOR ROASTING AND SINTERING
PULVERULENT SULPHURIFEROUS ORES
Filed Nov. 15, 1933

Inventor:
Hans Klencke,
By Potter, Pierce & Scheffler
Attorneys

Patented Dec. 18, 1934

1,984,747

UNITED STATES PATENT OFFICE

1,984,747

PROCESS OF AND APPARATUS FOR ROASTING AND SINTERING PULVERULENT SULPHURIFEROUS ORES

Hans Klencke, Frankfort-on-the-Main, Germany, assignor to American Lurgi Corporation, New York, N. Y., a corporation of New York Application November 15, 1933, Serial No. 698,178
In Germany December 21, 1932

10 Claims. (Cl. 75—17)

This invention relates to a process of and apparatus for roasting and sintering pulverulent sulphuriferous ores.

It is known to carry out the roasting and sintering of pulverulent ores having a high sulphur content on the blast roasting apparatus. This process consists in burning the pulverulent ores with or without addition of fuel, in an ignition apparatus similar to a coal dust burner arranged above the sintering hearth of a blast roasting apparatus, said pulverulent ores thus falling on to the ore charge on said hearth and being roasted and sintered together with said latter.

The burning pulverulent ore is retained by the ore-charge on the blast roasting apparatus, said ore-charge thus acting to a certain extent as a filter.

It has now been ascertained in accordance with the present invention, that in this known process the constituents contained in the pulverulent ore can at the same time be separated by passing the more volatile solid constituents of said ore, such as zinc oxide, arsenic oxide and cadmium oxide, through the filter.

To this end, coke or other reducing material is added to the filtering layer, for example, a layer of agglomerate—produced in the process itself—and coke being employed as a filtering layer. The reducing material such as coke which is mixed with a filtering layer has the effect of reducing the oxides of the volatile metals formed from the pulverulent ore and volatilizing said metals. Being then present in the fine subdivided form these metals can no longer be retained by the filtering layer.

It is not essential for the filtering layer to consist of a mixture of reducing material and the ore to be roasted. The process may also be carried into practical effect by merely charging the pulverulent ore to be roasted through the igniting apparatus whereby it reaches the filter in an already completely or partially roasted condition. Sintering can then take place on the filter and the granular sintered waste is employed in association with coke to function as the filter layer. Instead of employing return material produced in the process itself obviously other suitable materials, for example, more or less finely granular oxidic iron ores, can be employed in the filter layer.

The process can however also be conducted by avoiding sintering in the filter layer. In such case a more or less granular material is obtained which can be employed subsequently in a suitable manner. The disposition of the filter layer can be varied within wide limits, for example, said layer may be disposed upon a travelling grate which passes underneath the igniting device. It is however also possible to cause the filter layer to travel from above downwardly or conversely and to dispose the igniting device in a suitable position in front of said filtering layer. The proportion of coke in the filtering layer can vary as desired. It depends, inter alia, upon the quantity of metal to be volatilized which is contained in the material to be roasted. Moreover when measuring the quantity of coke added the degree of sintering which is obtained in the filtering layer is also to be taken into account. Ore coke also, that is to say, a mixture of coke and dead roasted material can be employed provided that a sufficiently large quantity of coke be added.

In order more clearly to understand the nature of the invention, reference is made to the accompanying drawing which illustrates diagrammatically and by way of example, two embodiments of apparatus suitable for carrying the process into practical effect.

Fig. 1 illustrates a travelling grate 1, such as a band sintering apparatus upon which the filter layer 3 is introduced by means of a charging device 2. The material to be roasted is blown on to the filtering layer through the igniting and charging device 4 by means of auxiliary devices which are known per se. The volatile constituents of the material pass with the roasting gases through the filtering layer into the suction boxes 5, the usual number of which are provided. A conveying device, such as a fan 6 connects the suction boxes with the dust removing plant 9 via the conduits 7 and 8, said plant being shown in the embodiment as an electrical gas cleaning apparatus. The dust is removed through the outlet opening 10, and the purified roasting gases are led off from the dust removing apparatus through pipe 11. The filter layer 3 which has taken up the non-volatile portions of the roasted material, is discharged from the band sintering apparatus at 12 and conveyed to its place of use.

Figure 2:
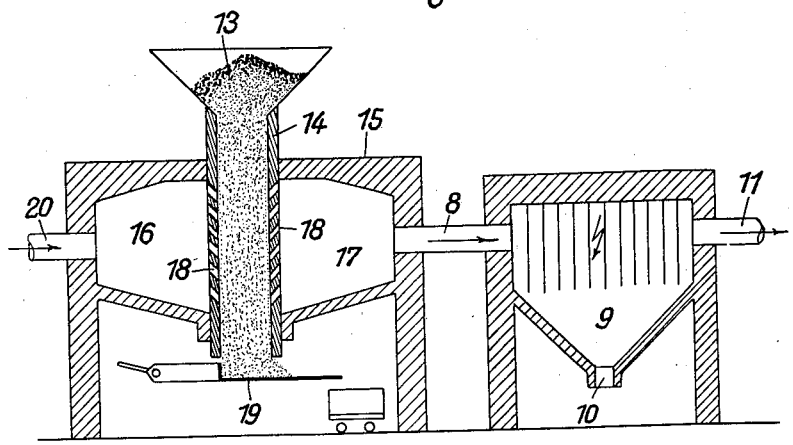

In the embodiment illustrated in Fig. 2, a filter layer 13 is employed in place of the travelling grate 1 of the embodiment of Fig. 1, said filter layer gradually moving downwards between the parallel walls 14. The walls divide the furnace 15 into two chambers 16 and 17. Said walls are provided inside the chambers with a plurality of perforations 18. 19 is the outlet and 20 the charging and igniting device. The dust removing plant can be constructed in the same manner as that illustrated in Fig. 1.

If it be desired to roast zinciferous pyrites, the material to be roasted, so far as it is not already present in a suitable form, is comminuted to the requisite grain size. On entering the device 4 it is ignited and roasting begins. An excess of roasting air is introduced into the apparatus 4 together with the ore. Filtering material consisting of coke or lean coke and agglomerate or the like is charged on to the travelling grate 1 by means of the charging device 2. When the dead roasted ore impinges on the filter layer, the combustible constituents of the latter are ignited so that the layer becomes incandescent. The action of said layer is then merely to retain the solid constituents of the stream of ore and roasting air which are incapable of volatilization. Compounds of volatile metals contained in the ore, such as zinc, arsenic, cadmium and other volatile metals are reduced to the metallic state by the fuel content in the filter layer, so that they pass through said layer together with the roasting and combustion gases into the suction box 5. Reoxidation of the metallic vapours, which can also occur even in the filtering layer, does not hinder the volatilization. The roasting and combustion gases in conjunction with the volatile oxides are then conveyed through the device 6, 7, 8 into the dust removing plant, said oxides being then precipitated from the gases. The oxides can be used in the customary manner for colouring purposes for the recovery of metals and for similar purposes whilst the roasting gas can be utilized for example, for the manufacture of sulphuric acid. After passing through the roasting and igniting device 4, the filter layer contains the iron oxide introduced into the process with the ore to be roasted. The roasting can be continued further upon the portion of the circulating band which is for the time, between the furnace 4 and the discharge device 12. This part of the apparatus may however also be constructed as a cooling device.

When utilizing the apparatus illustrated in Fig. 2, the process is carried out in principle in the same manner as before. The material to be roasted and the combustion air required for the process enter at 20 into the furnace 15 and the ignition occurs in the chamber 16. At this point, roasting also occurs which is already complete to a more or less degree depending on the granular size of the material when it impinges on the filter layer.

The present invention is primarily applicable to originating materials in the form of ores having a high sulphur content, for the reason that the requisite hot flame for the combustion of the pulverulent ore could scarcely be produced by burning pulverulent originating material which per se only has a moderate or low sulphur content.

It has nevertheless been ascertained that such lower grade originating materials may be worked up by the process of the present invention by producing the requisite hot flame by igniting the pulverulent ores in admixture with fuels such as powdered coal or combustible gases.

I claim:—

1. A process for roasting and sintering pulverulent ores containing sulphur and volatile constituents which comprises igniting said pulverulent ores in conjunction with other fuels, passing the current of ore and excess roasting air through a layer which retains the solid constituents and contains incandescent reducing material in quantities sufficient at least for reducing and volatilizing said volatile constituents.

2. A process for roasting pulverulent ores containing sulphur and volatile constituents which comprises igniting said pulverulent ore in conjunction with other fuels, passing the current of ore and excess roasting air through a layer which retains the solid constituents and contains incandescent reducing material in quantities sufficient at least for reducing and volatilizing said volatile constituents.

3. A process for roasting and sintering pulverulent pyrites containing volatile constituents which comprises igniting said pulverulent ore in conjunction with other fuels passing the current of ore and excess roasting air through a layer which retains the solid constituents and contains incandescent reducing material in quantities sufficient at least for reducing and volatilizing said volatile constituents.

4. A process for roasting pulverulent pyrites containing volatile constituents which comprises igniting said pulverulent ore in conjunction with other fuels passing the current of ore and excess roasting air through a layer which retains the solid constituents and contains incandescent reducing material in quantities sufficient at least for reducing and volatilizing the said volatile constituents.

5. A process for roasting and sintering pulverulent pyrites containing volatile constituents which comprises igniting said pulverulent ore in the absence of other fuels, passing the current of ore and excess roasting air through a layer which retains the solid constituents and contains incandescent reducing material in quantities sufficient at least for reducing and volatilizing said volatile constituents.

6. A process for roasting and sintering pulverulent pyrites containing zinc, arsenic and cadmium which comprises igniting said pulverulent ore in conjunction with other fuels, passing the current of ore and excess roasting air through a layer which retains the solid constituents and contains incandescent reducing material in quantities sufficient at least for reducing and volatilizing said volatile constituents.

7. A process for roasting and sintering pulverulent pyrites containing zinc, arsenic and cadmium which comprises igniting said pulverulent ore in the absence of other fuels, passing the current of ore and excess roasting air through a layer which retains the solid constituents and contains incandescent reducing material in quantities sufficient at least for reducing and volatilizing said volatile constituents.

8. A process for roasting and sintering pulverulent ores containing sulphur and volatile constituents which comprises igniting said pulverulent ore in conjunction with other fuels passing the current of ore and roasting air through a layer consisting of a mixture of agglomerate and coke which retains the solid constituents.

9. A process for roasting and sintering pulverulent pyrites containing volatile constituents which comprises igniting said pulverulent ore in conjunction with other fuels passing the current of ore and roasting air through a layer consisting of a mixture of agglomerate and coke which retains the solid constituents.

10. A process for roasting and sintering pulverulent pyrites containing zinc, arsenic and cadmium which comprises igniting said pulverulent ore in conjunction with other fuels passing the current of ore and roasting air through a layer consisting of a mixture of agglomerate and coke which retains the solid constituents.

HANS KLENCKE.